(12) United States Patent
Giannini et al.

(10) Patent No.: US 11,615,375 B2
(45) Date of Patent: Mar. 28, 2023

(54) ELECTRONIC MANAGEMENT OF SUPPLY CHAIN FACTORING WITH SHARED STATE STORAGE IN A DISTRIBUTED LEDGER

(71) Applicant: dexFreight, Inc., Sunrise, FL (US)

(72) Inventors: Adrian Pablo Giannini, Weston, FL (US); Renat Khasanshyn, San Juan, PR (US); Rajat Rajbhandari, Dallas, TX (US); Hector Hernandez, Weston, FL (US); Ricardo Escobar, Coral Gables, FL (US); Judeh M. Handoush, Jacksonville, FL (US)

(73) Assignee: dexFreight, Inc., Sunrise, FL (US)

( * ) Notice: Subject to any disclaimer, the term of this patent is extended or adjusted under 35 U.S.C. 154(b) by 0 days.

(21) Appl. No.: 17/366,948

(22) Filed: Jul. 2, 2021

(65) Prior Publication Data
US 2023/0004925 A1    Jan. 5, 2023

(51) Int. Cl.
| | | |
|---|---|---|
| *G06F 16/23* | (2019.01) | |
| *G06F 21/62* | (2013.01) | |
| *G06F 3/14* | (2006.01) | |
| *G06Q 10/087* | (2023.01) | |
| *G06Q 20/38* | (2012.01) | |
| *G06Q 40/02* | (2023.01) | |

(52) U.S. Cl.
CPC ......... *G06Q 10/087* (2013.01); *G06Q 20/389* (2013.01); *G06Q 20/3829* (2013.01); *G06Q 40/02* (2013.01); *G06Q 2220/00* (2013.01)

(58) Field of Classification Search
CPC ............. G06Q 10/087; G06Q 20/3829; G06Q 20/389; G06Q 40/02; G06Q 2220/00
See application file for complete search history.

(56) References Cited

U.S. PATENT DOCUMENTS

| | | | | |
|---|---|---|---|---|
| 2020/0084037 | A1* | 3/2020 | Zhang | H04L 9/085 |
| 2021/0014065 | A1* | 1/2021 | Gourisetti | H04L 9/3236 |
| 2021/0272037 | A1* | 9/2021 | Hanebeck | H04W 4/35 |
| 2021/0357386 | A1* | 11/2021 | Pratt | A63F 13/85 |
| 2022/0027803 | A1* | 1/2022 | Irazabal | G06Q 10/047 |

* cited by examiner

*Primary Examiner* — Talia F Crawley
(74) *Attorney, Agent, or Firm* — CRGO Global; Steven M. Greenberg

(57) ABSTRACT

Supply chain factoring utilizing shared state information stored in a distributed ledger includes the selection of an electronic supply chain document associated with an order for goods by a purchaser of the goods and the minting of a cryptographic token on behalf of a seller of the goods. the token encapsulating a purchase price for the order and associated order terms. A location is reserved in the ledger into which the token is uploaded. Subsequently, factoring terms are published at the reserved location by a factoring agency supporting the factorization of the purchase price. The seller then validates an ascension to the factoring terms in the reserved location. Finally, the reserved location is annotated to indicate satisfaction of the factoring terms upon the purchase price being paid to the factoring agency and a fraction of the purchase price being paid by the factoring agency to the seller of goods.

15 Claims, 3 Drawing Sheets

ELECTRONIC MANAGEMENT OF SUPPLY CHAIN FACTORING WITH SHARED STATE STORAGE IN A DISTRIBUTED LEDGER

BACKGROUND OF THE INVENTION

Field of the Invention

The present invention relates to the technical field of supply chain financing and more particularly to the electronic management of factoring in a supply chain.

Description of the Related Art

A supply chain is a network between a company and its suppliers to produce and distribute a specific product, and the supply chain represents the steps it takes to get the product or service to the customer. Supply chain management is a crucial process because an optimized supply chain results in lower costs and a faster production cycle. Business logistics management refers to the production and distribution process within the company, while supply chain management includes suppliers, manufacturers, logistics and transportation companies and retailers that distribute the product to the end customer. Supply chains include every business that comes in contact with a particular product, including companies that assemble and deliver parts to the manufacturer.

Factoring is a financial transaction and a type of debtor finance in which a business in the supply chain sells at a discount its accounts receivable of a buyer to a third party often referred to as a factor. A business in a supply chain often will "factor" receivable assets to meet present and immediate cash needs generally to support manufacturing and growth efforts. Factoring is commonly referred to as accounts receivable factoring, invoice factoring, and sometimes accounts receivable financing. But accounts receivable financing is a term most accurately used to describe this form of asset based lending against accounts receivable.

In factoring, the initial sale of a receivable by a seller in the supply chain transfers ownership of the receivable to the factor, such that the factor obtains all of the rights associated with the receivables. Accordingly, the receivable becomes the asset of the factor, and the factor obtains the right to receive the payments made by the debtor for the invoice amount and is free to pledge or exchange the receivable asset without unreasonable constraints or restrictions. Usually, the account debtor is notified of the sale of the receivable, and the factor makes all collections; however, non-notification factoring, where the seller collects the accounts sold to the factor, as agent of the factor, also occurs.

Central to the success of the factoring process is the accurate exchange of reliable information as to the terms of sale of goods or services for which payment is subject to factoring, and the access to a broader market of factors in optimizing the cost of the transaction. Presently, factoring is largely a manual process in which the personal relationship between factor and seller of the goods or services drives the nature of each factored transaction and the volume of such transaction. For unfamiliar pairs of factors and sellers, trust is lacking as is the timely knowledge of factoring opportunities. Accordingly, inefficiencies remain integral to conventional supply chain factoring.

BRIEF SUMMARY OF THE INVENTION

Embodiments of the present invention address technical deficiencies of the art in respect to supply chain financing and specifically, to the management of transaction factoring. To that end, embodiments of the present invention provide for a novel and non-obvious method for supply chain factoring utilizing shared state information stored in a distributed ledger. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for supply chain factoring utilizing shared state information stored in a distributed ledger includes the selection of an electronic supply chain document associated with an order for goods or services (hereinafter for the sake of textual simplicity) goods by a purchaser of the goods, for instance a purchase order or an invoice. Thereafter, the seller of the goods directs a minting of a cryptographic token. In this regard, the cryptographic token can be representative of the electronic supply chain document such that the cryptographic token encapsulates a purchase price for the order and associated order terms along with an indication of the economic rights and ownership of the goods subject to the transaction. A location is then reserved in a distributed ledger that can be remotely accessed from over a computer communications network. The cryptographic token can then be uploaded to the reserved location in a distributed ledger.

Once the cryptographic token has been uploaded to the reserved location of the distributed ledger on behalf of the seller of the goods, a factor supporting the factorization of the purchase price can access the reserved location of the distributed ledger in order to publish factoring terms at the reserved location. In particular, the factorization of the purchase price tangibly can be correlated to an assignment by the seller of the goods to the factoring agency of the cryptographic token stored in the reserved location. To the extent that the factoring terms are accepted by the seller of the goods, the seller of the goods validates writes an ascension to the factoring terms to the reserved location of the distributed ledger in connection with the published factoring terms. Finally, once the factoring terms have been satisfied upon the purchase price for the goods having been paid to the factoring agency by a purchaser of the goods and a fraction of the purchase price having been paid by the factoring agency to the seller of goods, the reserved location in the distributed ledger can be annotated to indicate the satisfaction of the factoring terms.

In one aspect of the embodiment, the reserved location during the reservation is set initially on behalf of the seller of the goods so as to permit read access without authorization to entities seeking access, and without the need for a password or key so as to read information within the electronic supply chain document. However, separate and independent from read and write access permissions, entities are neither permitted to introduce new permissions, nor change existing read permissions, nor change/introduce read and write access permissions, and the right to delete content at the specified location.

In yet another aspect of the embodiment, the distributed ledger includes a query interface adapted to permit querying of the distributed ledger for a listing of available cryptographic tokens. Optionally, the query interface receives credit risk information in connection with the order for goods and writes the credit risk information to the reserved location in the distributed ledger. In even yet another aspect of the embodiment, the uploading of the cryptographic token is signed by a private key of the seller of the goods and the factoring terms are signed by a private key of the factoring agency.

In another embodiment of the invention, a data processing system is adapted for supply chain factoring utilizing shared state information stored in a distributed ledger. The system includes a host computing platform that has one or more computers, each with memory and one or processing units including one or more processing cores. The system also includes a factorization management module having computer program instructions enabled while executing in the memory of at least one of the processing units of the host computing platform to select an electronic supply chain document associated with an order for goods by a purchaser of the goods, to mint a cryptographic token on behalf of a seller of the goods that is representative of the electronic supply chain document and encapsulating a purchase price for the order and associated order terms and to reserve a location in a distributed ledger remotely accessible from over a computer communications network and uploading the cryptographic token to the reserved location in a distributed ledger.

The program instructions subsequently publish, on behalf of a factoring agency, at the reserved location in the distributed ledger, factoring terms of the factoring agency to factor the purchase price by receiving an assignment of the cryptographic token. Then, the program instructions validate in the reserved location of the distributed ledger in connection with the published factoring terms, an ascension to the factoring terms. Finally, the program instructions annotate the reserved location in the distributed ledger to indicate satisfaction of the factoring terms upon the purchase price being paid to the factoring agency and a fraction of the purchase price being paid by the factoring agency to the seller of goods.

In even yet another embodiment of the invention, a computing device is provided which includes a non-transitory computer readable storage medium having program instructions stored therein. The instructions are executable by at least one processing core of a processing unit so as to cause the processing unit to perform a method for supply chain factoring utilizing shared state information stored in a distributed ledger. In particular, the method includes selecting an electronic supply chain document associated with an order for goods by a purchaser of the goods and minting a cryptographic token on behalf of a seller of the goods, such that the token encapsulates a purchase price for the order and associated order terms. The method additionally includes reserving a location in the ledger into which the token is uploaded and, subsequently, publishing factoring terms at the reserved location by a factoring agency supporting the factorization of the purchase price. The method even further includes validating an ascension to the factoring terms in the reserved location. Finally, the method includes annotating the reserved location to indicate satisfaction of the factoring terms upon the purchase price being paid to the factoring agency and a fraction of the purchase price being paid by the factoring agency to the seller of goods In this way, the technical deficiencies of conventional supply chain factoring are overcome owing to trustworthiness of secured, shared state information and owing to the access to the shared ledger by many possible factoring agencies seeking opportunities to engage in factored transactions irrespective of any pre-existing personal relationship between seller of goods and factor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for supply chain factoring utilizing shared state information stored in a distributed ledger. In accordance with an embodiment of the invention, a cryptographic token encapsulates data from an invoice memorializing a sales transaction between buyer and seller. The cryptographic token is then stored at an address in a distributed ledger. In this regard, the address at the distributed ledger incorporates a shared secret amongst different end users including a multiplicity of different factors. Consequently, one of the factors queries the distributed ledger in order to retrieve content from the cryptographic token and then writes factor terms to the address in the distributed ledger for the invoice terms of the cryptographic token. Upon the seller acceding to the factor terms, the accession of the seller to the factor terms can be written to the address of the distributed ledger. Once the invoice has been satisfied by the buyer so that the factor is paid, the completion of the factor terms are then written to the address of the distributed ledger. In this way the factored state of any invoice can be visible to each actor in the supply chain participating in supply chain factoring throughout the lifecycle of each factored invoice.

Figure 1:
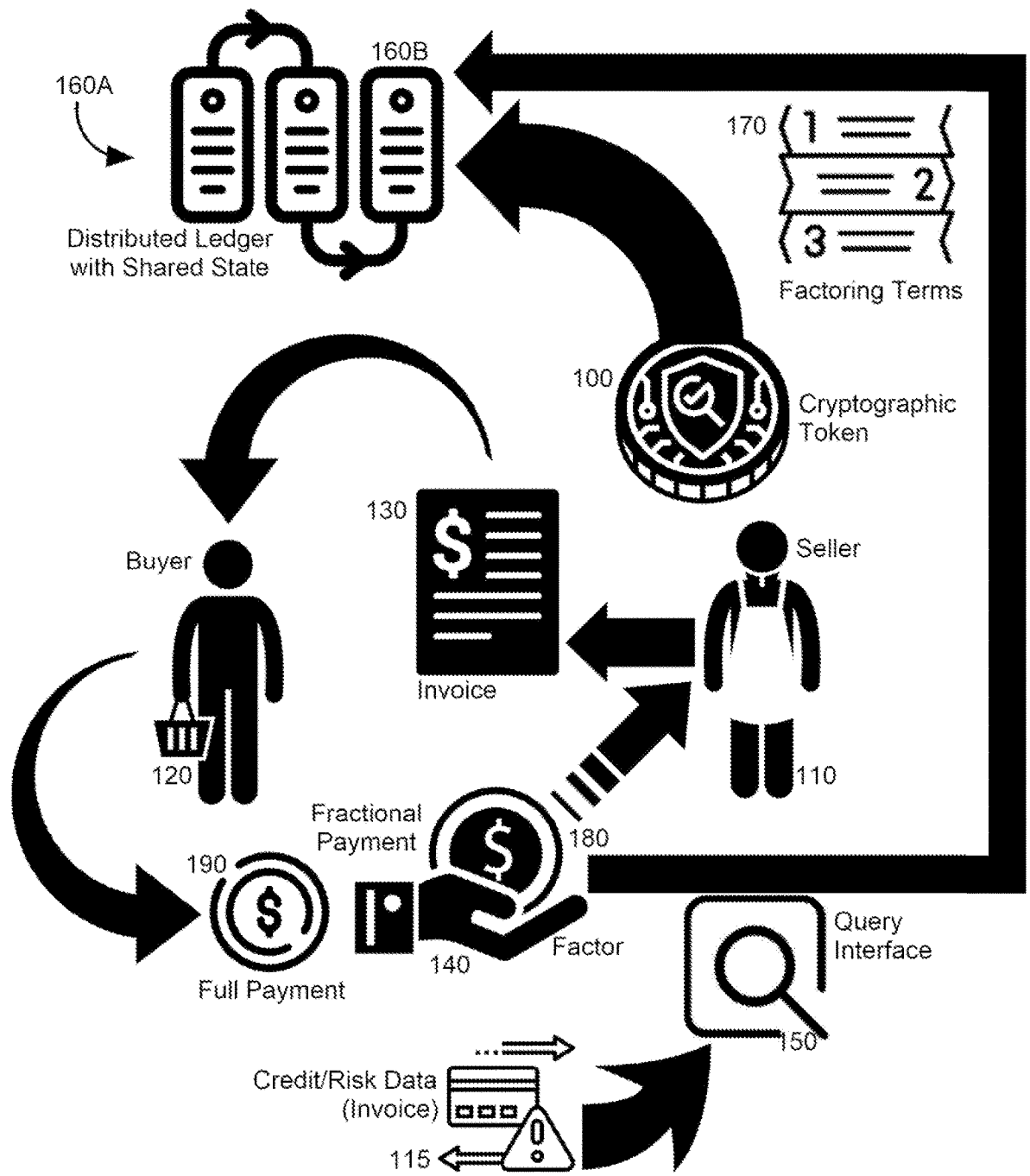
FIG. 1 is a pictorial illustration reflecting different aspects of a process of supply chain factoring utilizing shared state information stored in a distributed ledger.

In illustration of one aspect of the embodiment, FIG. 1 pictorially shows a process of supply chain factoring utilizing shared state information stored in a distributed ledger. As shown in FIG. 1, a seller 110 generates an invoice 130 and provides the invoice 130 to a buyer 120 of goods or services (collectively goods for the purpose of textual simplicity) from the seller 110. A cryptographic token 100 is created for the invoice 130 including different terms of sale evident in the invoice 130 such as an amount owing from the buyer 120 to the seller 110, a due date for payment and a mode of acceptable payment, by way of example. Optionally, the cryptographic token 100 can include one digital file or the cryptographic token 110 can be a composition of multiple different digital files wherein each of the digital file is assigned to a different factor in connection with a different portion of payment owed by the buyer 120, or each digital file can be assigned to a different invoice 130 to the extent that multiple invoices 130 are factored by the same factor as between the same seller 110. In any case, the cryptographic token 100 is then uploaded to an address 160B in a distributed ledger 160 with shared state meaning that the address 160B in the distributed ledger 160A provides for open read and write access to all so that multiple different accessors view a contemporaneous state stored at the address 160B of the distributed ledger 160A.

Thereafter, optionally, credit/risk data 115 for the invoice 130 is uploaded to the address 160B through the query interface 150 such as a computed credit risk of the buyer 120 or a historical performance of payment by the buyer 120. A factor 140 locates the cryptographic token 100 in the address 160B of the distributed ledger 160A by way of a query interface 150 to the distributed ledger 160A and retrieves not only the information pertaining to the invoice 130, but also the credit/risk data 115 for the invoice 130. The factor 140 then uploads to the address 160B, one or more factoring terms 170 for the invoice 130, such as a factoring percentage and a timing of payment to the seller 110 of the fractional payment 180 due for the invoice 130 accounting for the factoring. Once the factoring terms 170 are written to the address 160B, the seller 110 can direct the writing of an acceptance of the factoring terms 170 to the address 160B. Optionally, the token 100 includes an expiration date beyond which the token 100 expires and is marked expired and rendered inaccessible at the address 160B. However, absent expiration, once full payment 190 is provided to the factor 140 by the buyer 120, the factor 140 writes to the address 160B an indication of a satisfaction of the factoring terms 170.

Figure 2:
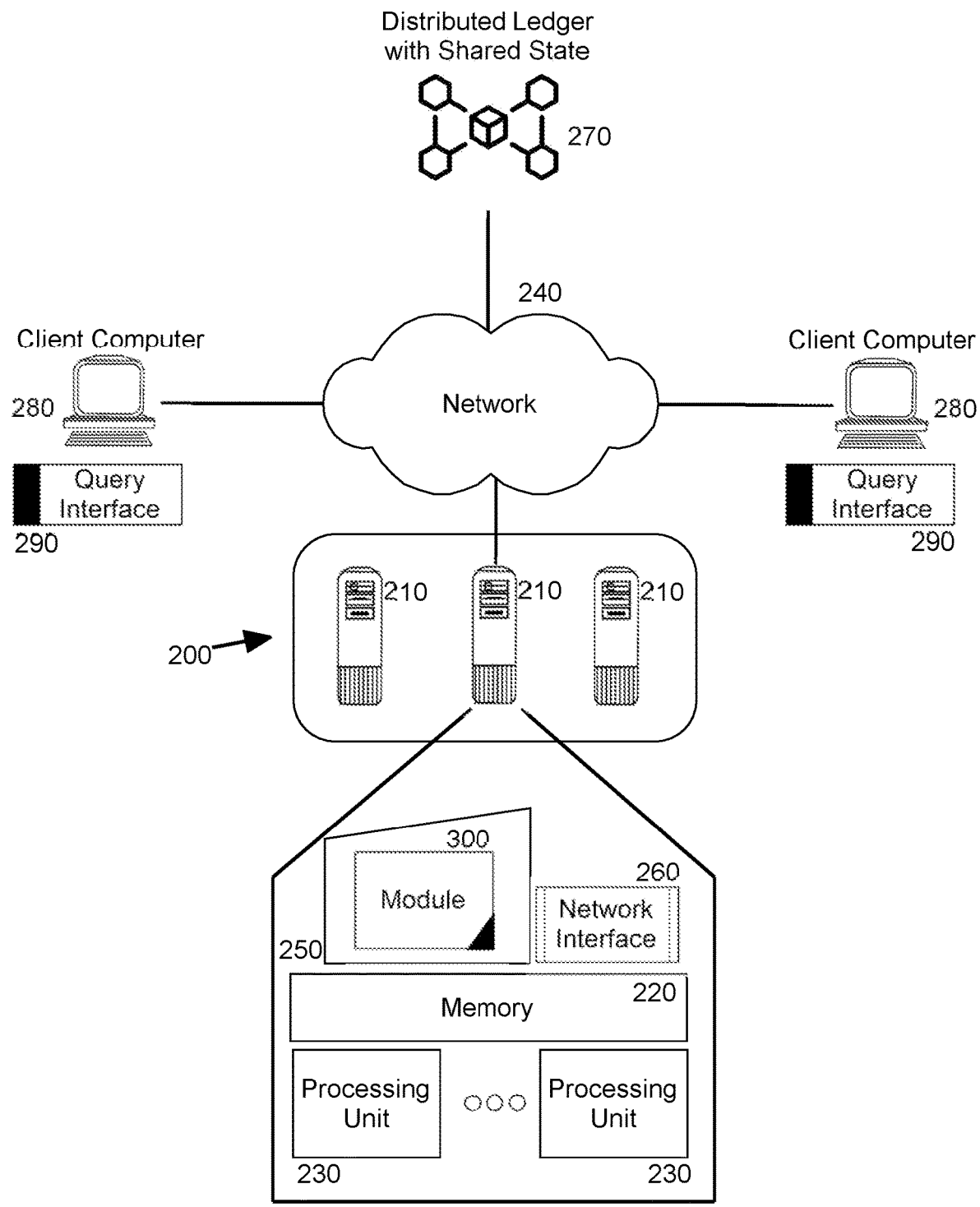
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform supply chain factoring utilizing shared state information stored in a distributed ledger. In the data processing system illustrated in FIG. 1, a host computing platform 200 is provided. The host computing platform 200 includes one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

Different client computers 280 are communicatively coupled to the data processing system 200. Each client computer 280 provides a query interface 290 through which queries may be executed against addressable locations of a distributed ledger 270 from over data communications network 240. In this regard, each of the addressable locations of the distributed ledger 270 includes a cryptographic token and different ledger entries indicative of a shared state of factoring an invoice as between a buyer, a seller and a factor of the invoice.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for supply chain factoring utilizing shared state information stored in a distributed ledger. Specifically, the program instructions during execution generate in the memory 220 on behalf of a request of a seller accessing the module 300 through a respective query interface 290, a cryptographic token representative of the terms of an invoice issued by the seller to a buyer. This process is known as minting a cryptographic token.

The program instructions then write the minted cryptographic token to an address in the distributed ledger 270 at which permissions are set to permit unrestricted read access and the right to add additional content thereto, but to prohibit subsequent modify and delete access to all including the creator of the cryptographic token. Subsequently, the program instructions receive from a factor through a respective query interface 290, a request to access the cryptographic token at the address of the distributed ledger 270 and a request to write factor terms to the same address of the distributed ledger 270 such that the address has a shared state as between the seller, buyer and factor. The program instructions yet further record at the same address of the distributed ledger 270, an accession by the seller to the factor terms.

Finally, the program instructions upon receipt of payment by the buyer to the factor, write an entry at the same address of the distributed ledger 270 indicating a satisfaction of the factor terms. In this way, potential participants to a factoring transaction of an invoice can, in an unlimited manner, remotely scan the distributed ledger for different factoring opportunities by accessing different ones of the cryptographic tokens without fear by the creator of the token (namely the seller of the goods) that any term of an offer to factor or of the invoice itself can be modified by a third party. As well, prospective factoring entities can remain assured that the meta-data encapsulated in the cryptographic token has not changed since the creation of the token. All can occur digitally without mandating personal knowledge between the factor and seller thus providing substantial technical advantage over traditional modes of coordinating a factoring arrangement—namely e-mail and telephone.

Figure 3:
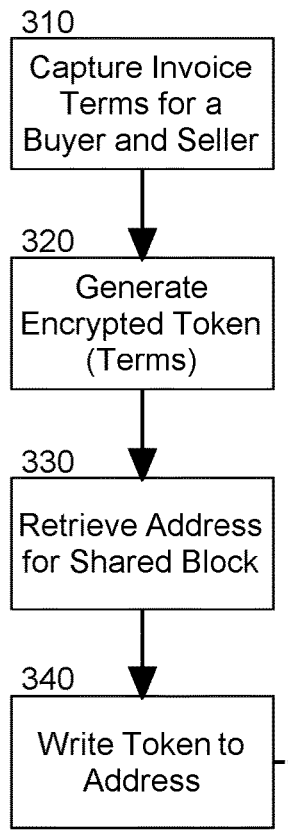
Figure 3:
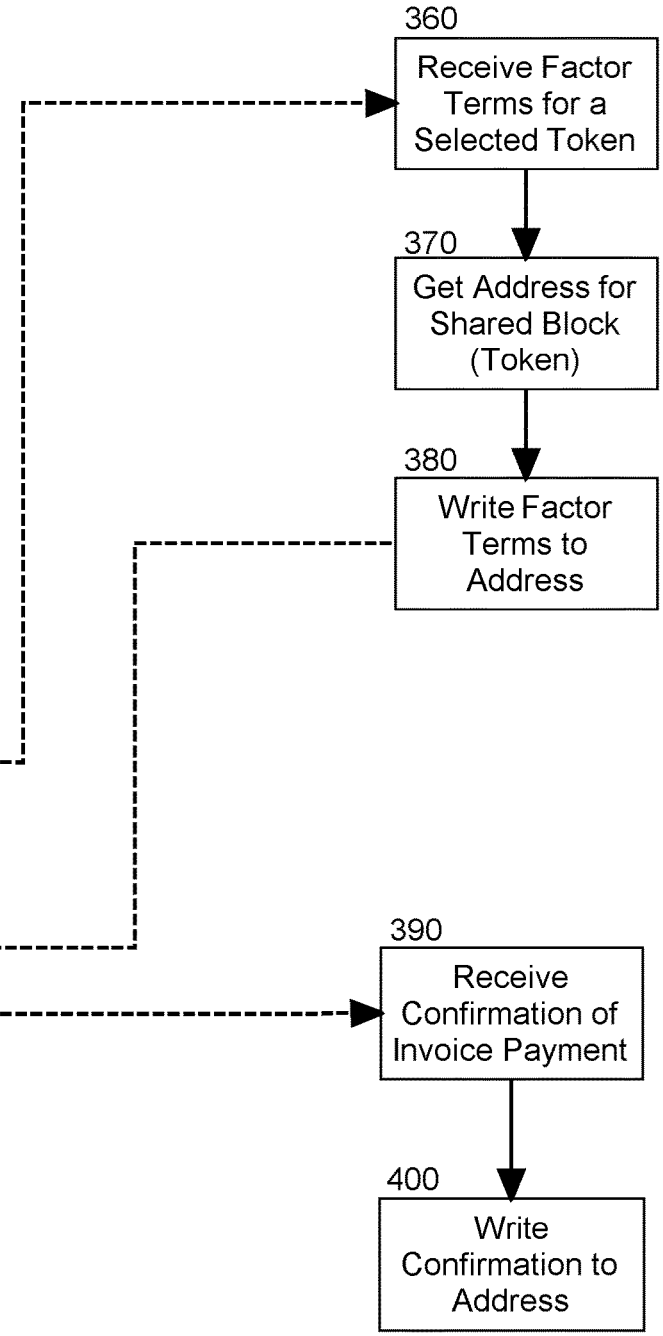

In further illustration of an exemplary operation of the module, FIG. 3 is a flow chart illustrating one of the aspects of the process of FIG. 1. Beginning in block 310 invoice terms for a sales transaction from seller to buyer is captured in memory of a computer and in block 320, a cryptograph token is generated encapsulating the invoice terms. Then, in block 330 an address for a location in a shared block of a blockchain is selected and the cryptographic token is written to the selected address of the shared block of the block chain.

In block 360, factor terms are received from a factor in connection with the invoice terms encapsulated in the cryptographic token stored at the shared block of the blockchain. Then, in block 370 an address of the shared block is determined, and the factor terms are then written into the shared block at the determined address. Subsequently, in block 350, an indication of ascent to the factor terms are received from the seller and written to the shared block at the determined address. Thereafter, in block 390 a confirmation of payment of the invoice is received and finally, in block 400, a confirmation record is written to the shared block at the determined address.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for supply chain factoring utilizing shared state information stored in a distributed ledger, the method comprising:

selecting an electronic supply chain document associated with an order for goods or services by a purchaser of the goods or services;

minting a cryptographic token representative of terms of an invoice representative of the electronic supply chain document issued by a seller of the goods or services by the purchaser of the goods or services;

reserving a location in a distributed ledger at a network address of the location which is remotely accessible from over a computer communications network and setting permissions at the location for unrestricted read access and a right to add additional content but to prohibit subsequent modify and delete access to all parties including a creator of the minted cryptographic token;

writing the minted cryptographic token to the location at the network address and uploading to the location meta-data for the terms;

receiving through a query interface factoring terms by a factoring agency to factor the purchase price and a request to access the minted cryptographic token at the location specified by the network address and responding to the query interface by writing the factoring terms at the location specified by the network address such that the location has a shared state as between the seller, purchaser and factoring agency;

validating in the reserved location of the distributed ledger in connection with the published factoring terms, an ascension to the factoring terms; and, annotating the reserved location in the distributed ledger to indicate satisfaction of the factoring terms upon the purchase price being paid to the factoring agency and a fraction of the purchase price being paid by the factoring agency to the seller of goods.

2. The method of claim 1, wherein the reserved location during the reservation is set to permit reading of and appending to content placed therein without pre-authorization by an entity seeking to read the content, but wherein the reservation is set to prohibit modification of the content and deletion of the content by all entities including a creator of the content.

3. The method of claim 1, wherein the distributed ledger includes a query interface adapted to permit querying of the distributed ledger for a listing of available cryptographic tokens.

4. The method of claim 3, wherein the query interface receives credit risk information in connection with the order for goods and writes the credit risk information to the reserved location in the distributed ledger.

5. The method of claim 1, wherein the uploading of the cryptographic token is signed by a private key of the seller of the goods and the factoring terms are signed by a private key of the factoring agency.

6. A data processing system adapted for supply chain factoring utilizing shared state information stored in a distributed ledger, the system comprising:
   a host computing platform comprising one or more computers, each with memory and one or processing units including one or more processing cores; and,
   a factorization management module comprising computer program instructions enabled while executing in the memory of at least one of the processing units of the host computing platform to perform:
   selecting an electronic supply chain document associated with an order for goods or services by a purchaser of the goods or services;
   minting a cryptographic token representative of terms of an invoice representative of the electronic supply chain document issued by a seller of the goods or services by the purchaser of the goods or services;
   reserving a location in a distributed ledger at a network address of the location which is remotely accessible from over a computer communications network and setting permissions at the location for unrestricted read access and a right to add additional content but to prohibit subsequent modify and delete access to all parties including a creator of the minted cryptographic token;
   writing the minted cryptographic token to the location at the network address and uploading to the location meta-data for the terms;
   receiving through a query interface factoring terms by a factoring agency to factor the purchase price and a request to access the minted cryptographic token at the location specified by the network address and responding to the query interface by writing the factoring terms at the location specified by the network address such that the location has a shared state as between the seller, purchaser and factoring agency;
   validating in the reserved location of the distributed ledger in connection with the published factoring terms, an ascension to the factoring terms; and,
   annotating the reserved location in the distributed ledger to indicate satisfaction of the factoring terms upon the purchase price being paid to the factoring agency and a fraction of the purchase price being paid by the factoring agency to the seller of goods.

7. The system of claim 6, wherein the reserved location during the reservation is set to permit reading of and appending to content placed therein without pre-authorization by an entity seeking to read the content, but wherein the reservation is set to prohibit modification of the content and deletion of the content by all entities including a creator of the content.

8. The system of claim 6, wherein the distributed ledger includes a query interface adapted to permit querying of the distributed ledger for a listing of available cryptographic tokens.

9. The system of claim 8, wherein the query interface receives credit risk information in connection with the order for goods and writes the credit risk information to the reserved location in the distributed ledger.

10. The system of claim 6, wherein the uploading of the cryptographic token is signed by a private key of the seller of the goods and the factoring terms are signed by a private key of the factoring agency.

11. A computing device comprising a non-transitory computer readable storage medium having program instructions stored therein, the instructions being executable by at least one processing core of a processing unit to cause the processing unit to perform a method for supply chain factoring utilizing shared state information stored in a distributed ledger, the method including:
   selecting an electronic supply chain document associated with an order for goods or services by a purchaser of the goods or services;
   minting a cryptographic token representative of terms of an invoice representative of the electronic supply chain document issued by a seller of the goods or services by the purchaser of the goods or services;
   reserving a location in a distributed ledger at a network address of the location which is remotely accessible from over a computer communications network and setting permissions at the location for unrestricted read access and a right to add additional content but to prohibit subsequent modify and delete access to all parties including a creator of the minted cryptographic token;
   writing the minted cryptographic token to the location at the network address and uploading to the location meta-data for the terms;
   receiving through a query interface factoring terms by a factoring agency to factor the purchase price and a request to access the minted cryptographic token at the location specified by the network address and responding to the query interface by writing the factoring terms at the location specified by the network address such that the location has a shared state as between the seller, purchaser and factoring agency;
   validating in the reserved location of the distributed ledger in connection with the published factoring terms, an ascension to the factoring terms; and,
   annotating the reserved location in the distributed ledger to indicate satisfaction of the factoring terms upon the purchase price being paid to the factoring agency and a fraction of the purchase price being paid by the factoring agency to the seller of goods.

12. The computing device of claim 11, wherein the reserved location during the reservation is set to permit reading of and appending to content placed therein without pre-authorization by an entity seeking to read the content, but wherein the reservation is set to prohibit modification of the content and deletion of the content by all entities including a creator of the content.

13. The computing device of claim 11, wherein the distributed ledger includes a query interface adapted to permit querying of the distributed ledger for a listing of available cryptographic tokens.

14. The computing device of claim 13, wherein the query interface receives credit risk information in connection with the order for goods and writes the credit risk information to the reserved location in the distributed ledger.

15. The computing device of claim 11, wherein the uploading of the cryptographic token is signed by a private key of the seller of the goods and the factoring terms are signed by a private key of the factoring agency.

* * * * *